US011879819B2

(12) United States Patent
Paprotny et al.

(10) Patent No.: US 11,879,819 B2
(45) Date of Patent: Jan. 23, 2024

(54) MICROFABRICATED FRACTIONATOR FOR PARTICULATE MATTER MONITOR

(71) Applicant: The Board of Trustees of the University of Illinois, Urbana, IL (US)

(72) Inventors: Igor Paprotny, Urbana, IL (US); Dorsa Fahimi, Urbana, IL (US); Omid Mahdavipour, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 751 days.

(21) Appl. No.: 16/348,001

(22) PCT Filed: Nov. 9, 2017

(86) PCT No.: PCT/US2017/060857
§ 371 (c)(1),
(2) Date: May 7, 2019

(87) PCT Pub. No.: WO2018/089631
PCT Pub. Date: May 17, 2018

(65) Prior Publication Data
US 2019/0293523 A1 Sep. 26, 2019

Related U.S. Application Data

(60) Provisional application No. 62/419,705, filed on Nov. 9, 2016.

(51) Int. Cl.
*G01N 1/22* (2006.01)
*G01N 1/24* (2006.01)
(Continued)

(52) U.S. Cl.
CPC ...... *G01N 1/2211* (2013.01); *B01L 3/502761* (2013.01); *F04B 39/0027* (2013.01);
(Continued)

(58) Field of Classification Search
CPC ..... B01L 2200/0652; B01L 2300/0864; B01L 3/502761; F04B 39/0027; F04B 43/043;
(Continued)

(56) References Cited

U.S. PATENT DOCUMENTS 6,156,212 A * 12/2000 Rader ................. G01N 1/2211
210/512.1
6,746,503 B1 * 6/2004 Benett ................. B01D 45/08
156/345.19

(Continued)

FOREIGN PATENT DOCUMENTS

| CN | 105651643 A | 6/2016 |
|---|---|---|
| EP | 0 352 126 A2 | 1/1990 |

(Continued)

OTHER PUBLICATIONS

Igor Paprotny et al., "Microfabricated air-microfluidic sensor for personal monitoring of airborne particulate matter" Sens. Actuator A Phys. 201: p. 506-516 (2013).
(Continued)

*Primary Examiner* — Daniel S Larkin
*Assistant Examiner* — Nashmiya S Fayyaz
(74) *Attorney, Agent, or Firm* — McDonnell Boehnen Hulbert & Berghoff LLP

(57) ABSTRACT

Microfabricated particulate matter (PM) monitors and fractionators within the PM monitors are provided. A primary channel of a vertical or out-of-plane fractionator receives air samples, comprising particles of varying sizes, from the external environment. The air samples then pass through a plurality of microfluidic channels, wherein inertial forces are applied within the microfluidic channels to separate the particles by size. The fractionator comprises a horizontal air outlet for particles having a size below a threshold size and a vertical air outlet for particles having a size above a
(Continued)

threshold size. Thus, the proportion of PM in the air sample is reduced prior to deposition on a PM monitor. A virtual cyclone may also be provided that comprises a bend positioned at a flow path through a primary channel of the vertical microfabricated fractionator.

29 Claims, 10 Drawing Sheets

(51) Int. Cl.
| | |
|---|---|
| *G01N 15/06* | (2006.01) |
| *G01N 15/02* | (2006.01) |
| *G01N 15/00* | (2006.01) |
| *F04B 43/04* | (2006.01) |
| *F04B 45/047* | (2006.01) |
| *F04B 45/04* | (2006.01) |
| *B01L 3/00* | (2006.01) |
| *F04B 39/00* | (2006.01) |

(52) U.S. Cl.
 CPC .......... *F04B 43/043* (2013.01); *F04B 45/043* (2013.01); *F04B 45/047* (2013.01); *G01N 1/2205* (2013.01); *G01N 1/2273* (2013.01); *G01N 1/24* (2013.01); *G01N 15/0255* (2013.01); *G01N 15/0606* (2013.01); *G01N 15/0637* (2013.01); *B01L 2200/0652* (2013.01); *B01L 2300/0864* (2013.01); *G01N 2001/2223* (2013.01); *G01N 2015/0046* (2013.01)

(58) Field of Classification Search
 CPC ... F04B 45/043; F04B 45/047; G01N 1/2205; G01N 1/2211; G01N 1/2273; G01N 1/24; G01N 15/0255; G01N 15/0606; G01N 15/0637; G01N 2001/2223; G01N 2015/0046

USPC .............................................. 73/28.06, 865.5
 See application file for complete search history.

(56) References Cited

U.S. PATENT DOCUMENTS

| | | | | |
|---|---|---|---|---|
| 7,178,380 | B2* | 2/2007 | Shekarriz | ........... B01D 19/0094 73/28.04 |
| 7,261,007 | B2* | 8/2007 | Haglund | .................. B07B 7/00 95/32 |
| 7,275,453 | B2* | 10/2007 | Ishikawa | .............. G01N 1/2214 73/864.33 |
| 7,325,465 | B2* | 2/2008 | Solomon | ........... G01N 15/0255 73/863.22 |
| 9,791,353 | B2* | 10/2017 | Saaski | ................. G01N 1/4077 |
| 2003/0052281 | A1 | 3/2003 | Rader et al. | |
| 2003/0068231 | A1 | 4/2003 | Cabuz et al. | |
| 2009/0219686 | A1 | 9/2009 | Ishikawa et al. | |
| 2009/0297372 | A1 | 12/2009 | Amirouche et al. | |
| 2011/0072772 | A1* | 3/2011 | Ariessohn | ........... G01N 1/2202 55/428 |
| 2013/0036793 | A1 | 2/2013 | White et al. | |
| 2015/0216382 | A1 | 8/2015 | Bower et al. | |

FOREIGN PATENT DOCUMENTS

| | | |
|---|---|---|
| JP | S50-15597 A | 2/1975 |
| JP | A2009156454 A | 7/2009 |
| JP | 2013144274 A * | 7/2013 |

OTHER PUBLICATIONS

D. Fahimi et al., "MEMS air-microfluidic lab-on-a-chip sensor for personal monitoring of airborne particulate matter" Solid-stae, actuators, and microsystems workshop technical digest, p. 336-339 (2016).

Supplementary Partial European Search Report for European Application No. 17868751, 5 pages, dated May 27, 2020.

* cited by examiner

US 11,879,819 B2

MICROFABRICATED FRACTIONATOR FOR PARTICULATE MATTER MONITOR

CROSS-REFERENCE TO RELATED APPLICATIONS

This application is a U.S National Phase Application pursuant to 35 U.S.C § 317 of International Application No. PCT/US2017/060857, filed Nov. 9, 2017, which claims priority to U.S. Provisional Patent Application No. 62/419,705, filed Nov. 9, 2016, the contents of these applications being incorporated entirely herein by reference.

BACKGROUND

Airborne particulate matter (PM) pollutants are small solid particles or liquid droplets suspended in the atmosphere. PM pollutants may include, for instance, vehicle exhaust, tobacco smoke, coal dust, volcanic ash, or pollen. The size of PM pollutants may range from a few nanometers to many tens of microns. PM pollutants may be harmful to humans, because their size allows them to enter the respiratory system or even the bloodstream. PM monitors have accordingly been developed to detect PM pollutants.

Existing PM monitors, however, are not sized and configured for convenient and portable use in different types of locations. Additionally, existing PM monitors are generally unable to provide reliably accurate measurements of PM pollutants due to variations in temperature, humidity, etc., in different types of locations. Furthermore, existing PM monitors are not suitable for low cost, microscale production.

SUMMARY

Embodiments of the present disclosure relate to the manufacture and/or implementation of microfabricated fractionators for use with and assembly within PM monitors that measure concentrations of micro-sized particulate matter (PM) in air. Addressing the deficiencies of existing fractionators and PM monitors, embodiments provide enhanced compactness and manufacturability.

In one example embodiment, a fractionator for use with a particulate matter (PM) monitor is provided. The fractionator comprises a body defining a vertical air inlet to receive a stream of air from outside the body, the stream of air comprising particles of varying sizes, and a plurality of microfluidic channels, wherein inertial forces are applied within the microfluidic channels to separate the particles by size. The fractionator also includes a horizontal air outlet for particles having a size below a threshold size and a vertical air outlet for particles having a size above a threshold size.

In another example embodiment, a method to fabricate a vertical microfabricated fractionator is provided. The method includes etching a first wafer and a second wafer, wherein each of the first wafer and the second wafer comprises a three layer stack of a device layer affixed to a buried oxide (BOX) layer affixed to a handle layer. The method further includes rotating the first wafer such that the device layer of the first wafer faces the device layer of the second wafer, and bonding the device layer of the first wafer to the device layer of the second wafer.

The method may further include applying a mask to the device layer of the first wafer and the device layer of the second wafer and etching the device layer around the mask, wherein the portion of the device layer under the mask forms a collection probe, etching through the handle layer, BOX layer, and device layer of the first wafer to form a first part of a primary channel, and etching through the handle layer, BOX layer, and device layer of the second wafer to form a second part of the primary channel. Each handle layer of the first wafer and the second wafer comprises a first surface and a second surface, the second surface being affixed to the BOX layer. An opening at the first surface of the handle layer of the first wafer comprises a larger diameter than the opening at the handle layer to the second part of the primary channel of the second wafer.

In another example embodiment, a pump for a particulate matter (PM) monitor having a microfabricated device, such as a fractionator, is provided. The pump has a body forming a chamber, a membrane disposed in each chamber, an actuator coupled to each membrane, an inlet valve in fluid communication with the chamber, and an outlet valve in fluid communication with the chamber. The actuator is operable to displace the membrane in the chamber to generate a negative pressure that draws air into the chamber via the inlet valve and to expel the air from the chamber via the outlet valve.

In another example embodiment, a virtual cyclone for a particulate matter (PM) monitor is provided. A bend is positioned at a flow path through a primary channel (a minor flow path) of the vertical microfabricated fractionator and a collection chamber is positioned at the bend. Air in the minor flow path flows through the bend and PM in the air greater than a threshold size pass into the collection chamber.

DETAILED DESCRIPTION

Figure 1:
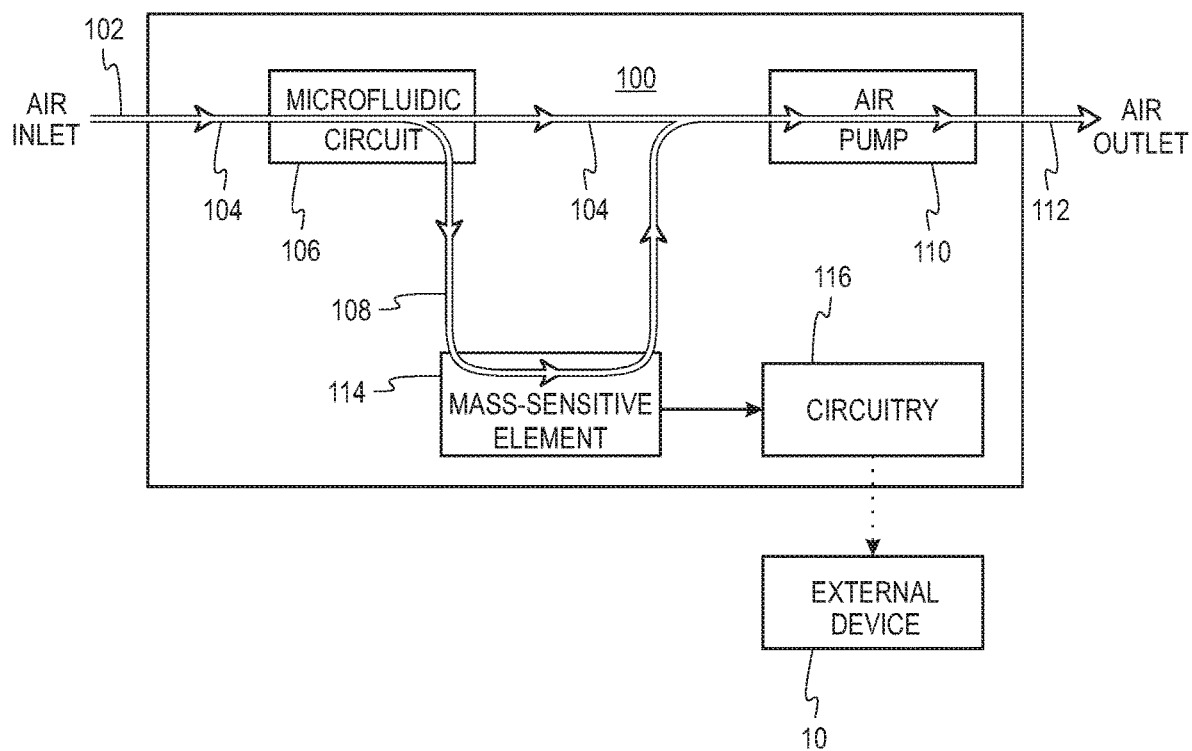
FIG. 1 illustrates an example particulate matter (PM) monitor that measures mass concentrations of PM in an air sample, according to aspects of the present disclosure.

FIG. 1 illustrates an example particulate matter (PM) monitor 100 that measures mass concentrations of PM in an air sample, according to aspects of the present disclosure.

The PM monitor 100 draws air samples from the external environment. Inertial forces filter concentrations of micron-sized PM contained in the air sample. PM pollutants may include, for example, coal dust, vehicle exhaust, tobacco smoke, volcanic ash, and airborne particles to which humans are often allergic, such as pollen and foodstuffs, which range in size from a few nanometers to many tens of microns.

The PM monitor 100 includes a first channel 104 that receives the air sample via an air inlet 102. The PM monitor 100 also includes an air microfluidic circuit 106 in fluid communication with the first channel 104. The microfluidic circuit 106 provides a vertical fractionator, described in further detail below, which divides the air sample into two airstreams: a first airstream continues in the first channel 104 and a second airstream flows via a bend into a second channel 108. Due to inertial forces, PM having a size less than a threshold size (e.g., $PM_{2.5}$ with aerodynamic diameter less than 2.5 µm) can flow into the bend with the second airstream. Meanwhile the remaining PM having a size greater than the threshold size generally cannot flow into the bend and thus continue with the first airstream.

The PM monitor 100 includes an air pump 110 that can create a pressure gradient to draw the air sample through the air inlet 102, the first channel 104, the microfluidic circuit 106, and out of the PM monitor 100 via an air outlet 112. The PM monitor 100 may also include a power source, such as a battery, to power the air pump 110 and any other components of the PM monitor 100.

A mass-sensitive element 114 is disposed in the second channel 108. The selected PM in the second airstream is deposited onto the mass-sensitive element 114. The mass-sensitive element 114 can be employed to measure a mass of the PM deposition. In some embodiments, the mass-sensitive element 114 may be a resonator that has a resonant frequency that changes in response to the mass of PM that is deposited onto the mass-sensitive element 114. For instance, the mass-sensitive element 114 may be a piezoelectric crystal such as a Film Bulk Acoustic Resonator (FBAR). Without PM deposition, the mass-sensitive element 114 may resonate at a higher frequency (e.g., approximately 1.6 GHz) than with PM deposition on the mass-sensitive element 114. As PM is deposited onto the mass-sensitive element 114, however, the resonant frequency of the mass-sensitive element 114 may decrease proportionally due to the additional mass.

The mass-sensitive element 114 is coupled to circuitry 116 that can measure the changing resonant frequency of the mass-sensitive element 114 in response to the PM deposition. For instance, the circuitry 116 may include a high-speed frequency counter to determine the rate of resonant frequency change for the mass-sensitive element 114. The mass concentration of selected PM in the stream of air can then be determined according to the change in the resonant frequency of the mass-sensitive element 114. The circuitry 116 may be coupled, via wired or wireless communication, to an external device 10 that can further process signals from the circuitry 116 conveying information about the mass concentration of the selected PM.

Figure 2A:
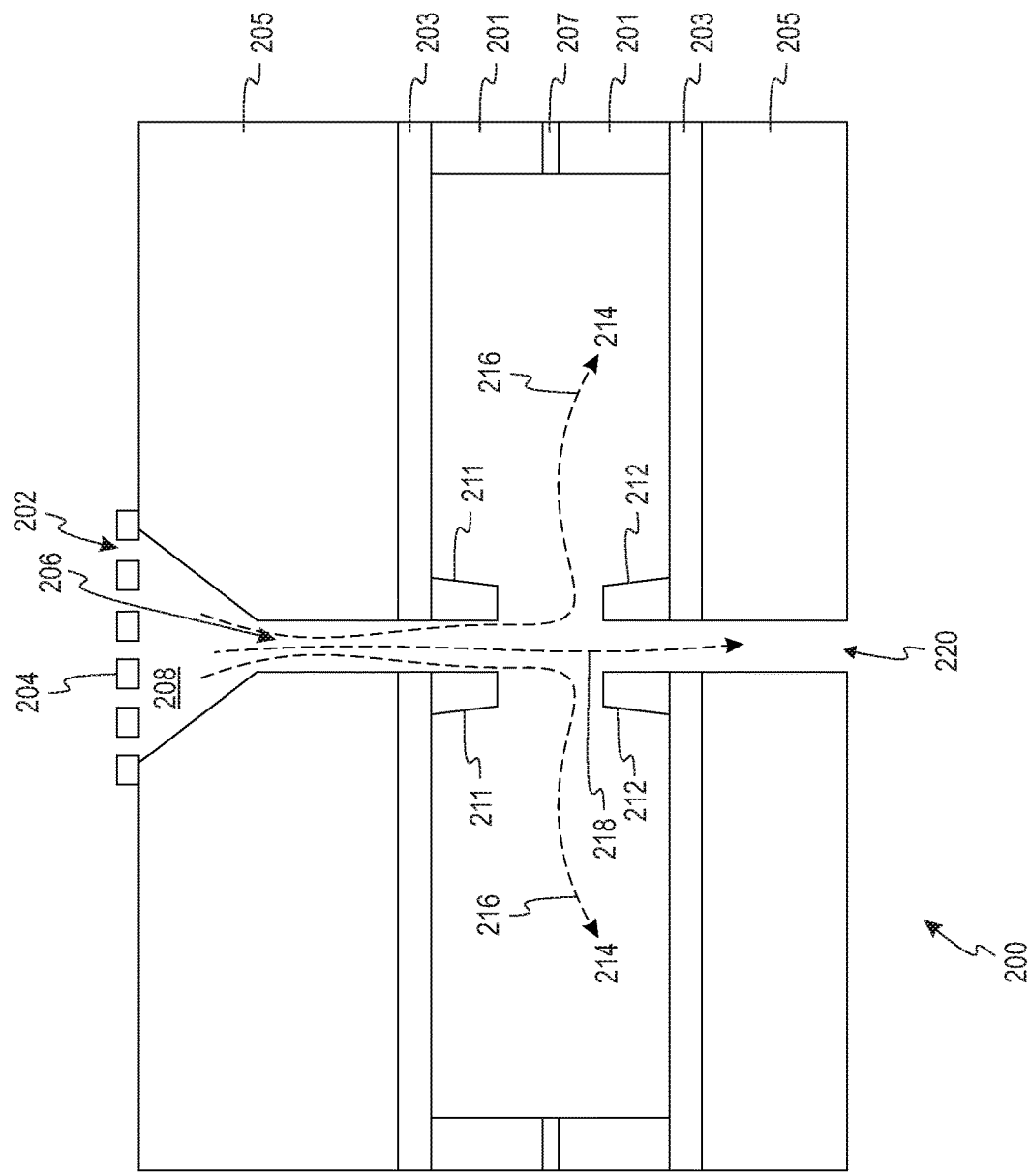
FIG. 2A illustrates an example cross-section of a microfabricated vertical fractionator for use with the PM monitor of FIG. 1, according to aspects of the present disclosure.

FIG. 2A illustrates an example microfabricated vertical fractionator 200, according to aspects of the present disclosure. The fractionator 200 may be used with a PM monitor, such as the PM monitor 100, for measuring concentrations of airborne particulate matter. The fractionator 200 may be fabricated such that it can be placed in close proximity to the mass sensing element of a PM monitor.

In certain embodiments, the fractionator 200 may be designed to select PM having an aerodynamic diameter of 2.5 microns or less ($PM_{2.5}$) for deposition onto a collection surface of a mass-sensitive element. The aerodynamic diameter may be selected to match the EPA, NIOSH, or other standards.

Each of two etched silicon-on-insular (SOI) wafers comprises a three layer material stack comprising an active layer of silicon (the device layer 201) affixed to a buried oxide (BOX) layer 203 of electrically insulating silicon dioxide, which is affixed to a bulk silicon support wafer (the handle layer 205). Bonding 207 affixes the device layers 201 of the two wafers to each other.

As shown in FIG. 2A, an inlet 202 to the fractionator 200 is provided on the first wafer, through which an air sample flows. A coarse inlet filter 204 extends across the inlet 202 to filter out large PM, for example PM with mean aerodynamic diameter larger than 10 (PM10). In one example embodiment, the coarse inlet filter 204 is a slot impactor. A primary channel 206 is in fluid communication with the inlet 202. The primary channel 206 may include an acceleration region 208 having a funnel shape that is wide at the inlet 202 and continuously narrows, via angular walls, to form the primary channel 206 having substantially parallel walls. A microfabricated top lip, referred to as an acceleration jet 211 of the primary channel forms an opening to secondary channels 214. The secondary channels 214 are shown in FIG. 2A to extend substantially perpendicular from the primary channel 206. A right angle between the primary channel and the secondary channels is not required, however, and in alternative embodiments, the secondary channels may be contoured to diverge from the primary channel at any suitable angle or direction known to those in the art. A bottom lip, referred to as a collection probe 212, is opposite the acceleration jet 211 and primary channel continues through the collection probe 212, and then through the second wafer to an outlet 220.

In operation, air samples, propelled by the pressure gradient produced by an air pump, flow through the coarse inlet filter 204 and proceed through the primary channel 206. Major flow, shown by paths 216, turns to follow paths that are in-plane with respect to the PM monitor via the secondary channels 214. Particles smaller than 2.5 microns may be carried in the major flow. The forward movement of the air samples, combined with the angles at which the secondary channels 214 branch from the primary channel 206, effectively strip smaller particles from the initial air stream and into the secondary channels 214. The secondary channels 214 may route PM to a mass-sensitive element for collection and analysis. Particles above a certain size (e.g., 2.5 µm) possess so much momentum that they cannot follow the divergent secondary channels 214 and remain in a minor flow path, shown by path 218, through primary channel 206 and then may be exhausted. The primary channel is an out-of-plane (vertical) path that leads to the outlet 220.

Figure 2B:
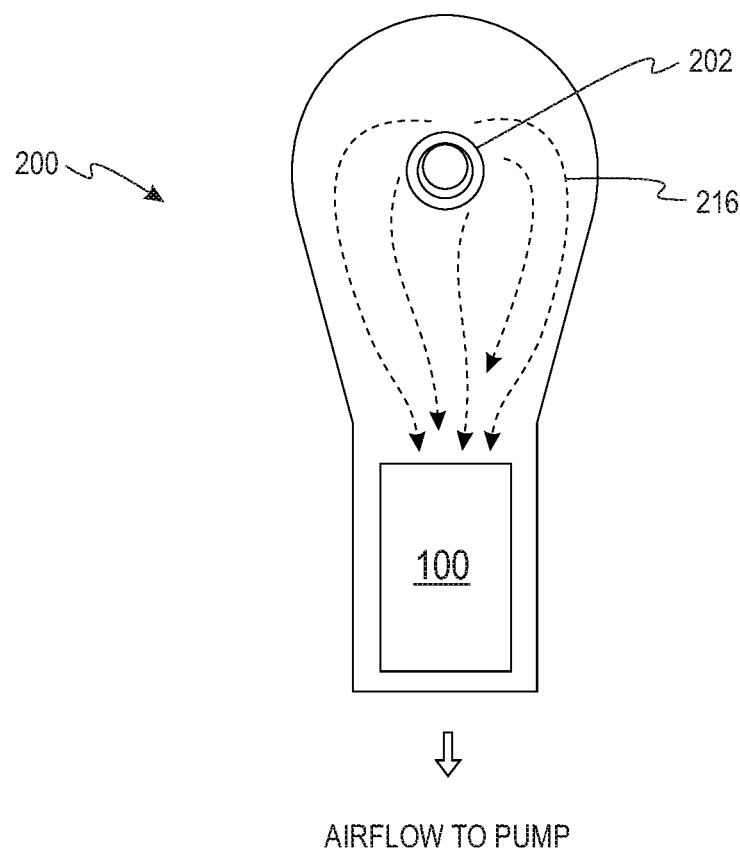
FIG. 2B illustrates a top view of the microfabricated vertical fractionator of FIG. 2A, according to aspects of the present disclosure.

FIG. 2B illustrates a top view of the microfabricated vertical fractionator of FIG. 2A, according to aspects of the present disclosure. In FIG. 2B example particle trajectories, shown by major flow paths 216, are depicted. The paths 216 lead to the detector for PM, which can be a mass-sensitive resonator, and further to a pump, such as the air pump 110.

Figure 2C:
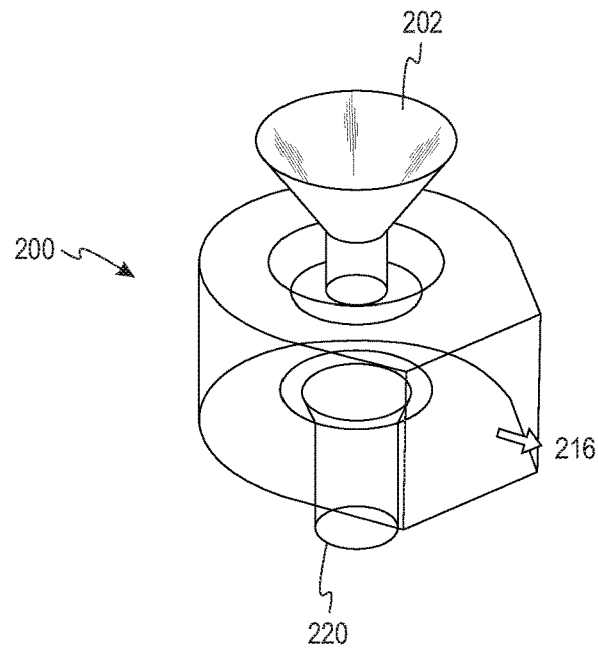
FIG. 2C illustrates a perspective view of a microfabricated vertical fractionator, such as the microfabricated vertical fractionator of FIG. 2A, according to aspects of the present disclosure.

FIG. 2C illustrates an example air volume of the microfabricated vertical fractionator such as the fractionator 200 of FIG. 2A, according to aspects of the present disclosure. The inlet 202 receives air samples, the air samples proceeding in a vertical direction through the fractionator to the outlet 220, as described with reference to FIG. 2A.

Figure 2D:
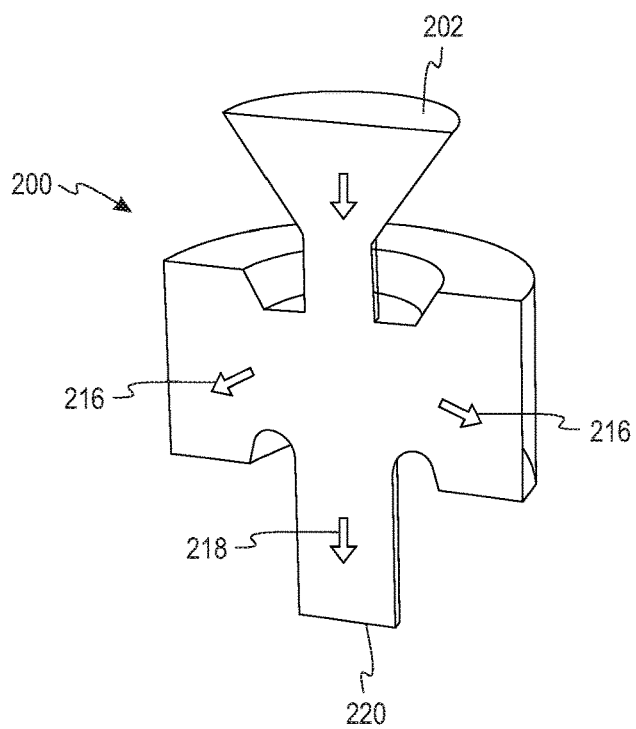
FIG. 2D illustrates a cross-sectional view of the microfabricated vertical fractionator of FIG. 2C, according to aspects of the present disclosure.

FIG. 2D illustrates a cross-sectional view of the microfabricated vertical fractionator 200 of FIG. 2C, according to aspects of the present disclosure. The major flow is shown by arrows 216 and the minor flow is shown by arrow 218.

The vertical fractionator 200 provides for the PM to move in a straight path. Prior designs provided an inlet of the monitor having a 90 degree turn before the fractionator and thus larger PM could potentially settle and foul the inlet. The design depicted in FIGS. 2A-D eliminates having the PM make a 90 degree turn and thus fouling the air-microfluidic channels can be averted. The configuration of the vertical fractionator 200 also permits the size of a PM monitor to be significantly reduced. Further, the vertical fractionator 200 is fabricated such that it can be placed in close proximity to a thermophoretic precipitator and/or mass sensing element of the PM monitor.

Figure 3:
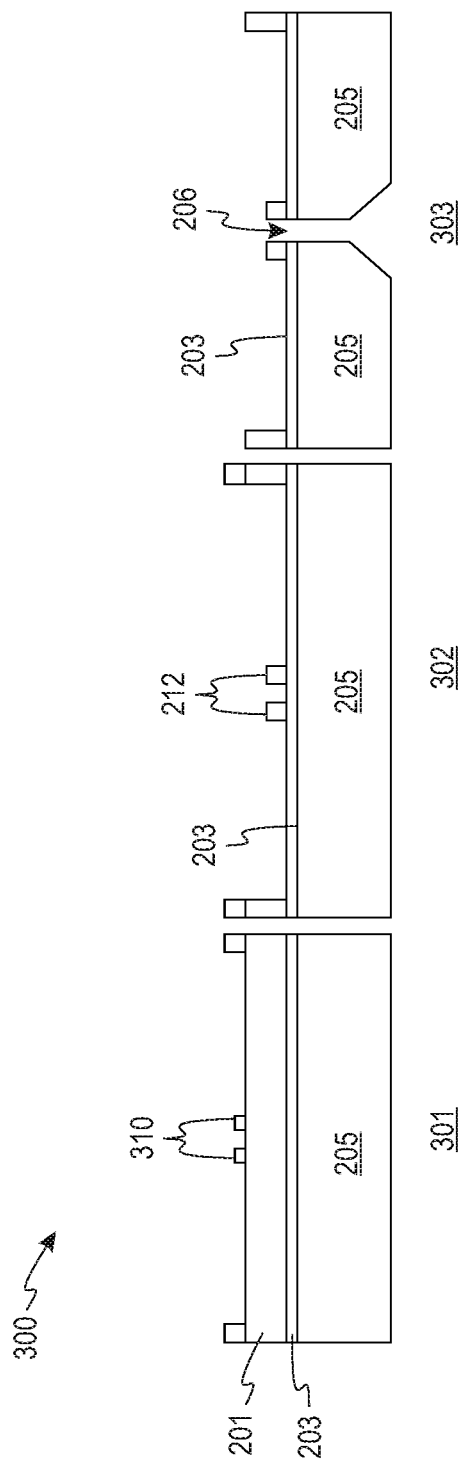
FIG. 3 illustrates an example fabrication process for a microfabricated vertical fractionator, according to aspects of the present disclosure.

FIG. 3 illustrates an example fabrication process 300 for a microfabricated vertical fractionator such as the fractionator 200, according to aspects of the present disclosure. This process is provided by way of example and not limitation. The dimensions, materials, order of steps, and the like may be varied in different embodiments of the invention.

Each of two etched silicon-on-insular (SOI) wafers comprises a three layer material stack comprising a device layer affixed to a first side of a BOX layer, and a second side opposite the first side of the BOX layer affixed to a handle layer.

The top SOI wafer may be inverted to form the vertical fractionator, such as the fractionator 200. In one example embodiment, the bottom SOI wafer is the middle wafer of the PM monitor from which the microfluidic channels are fabricated. In the present embodiment, the two wafers are first etched separately, then bonded using any of a variety of wafer-to-wafer (W2W) bonding methods to create the primary and secondary pathways. One bonding approach employs a dispenser printed curable resist to bond the two wafers at the die level. According to aspects of the present disclosure, however, an alternative bonding approach involves wafer-level bonding with anodic bonding, thermocompression bonding, or glass frit bonding. Such wafer-to-wafer bonding increases fabrication throughput as it permits wafer processing (versus die-sized) processing of the PM monitor, while providing an improved seal for the middle wafer and the top wafer. In some embodiments, markings are provided on each layer to allow for precise alignment/registration of the various components during fabrication/assembly.

FIG. 3 shows a first step 301 wherein a mask 310 is partially etched on the device layer 201 during deep reactive ion etching (DRIE) of the device layer. The handle layer 205 and BOX layer 203 are also shown. The mask allows for arbitrary thickening of any etched components. Thus, the size and shape of etched components can be altered as desired.

A second step 302 in FIG. 3 shows the resulting collection probe 212 that is formed from the device layer 201 after the deep reactive etching process is completed. In an alternative embodiment, the collection probe may be formed via 3D printing using 2-photon stereo lithography.

In a third step 303, the inlet 202 and the primary channel 206 are formed through the handle layer 205 and BOX layer 203 using a combination of DRIE and isotropic and/or nonisotropic etching.

The spacing between the outlet of the primary channel and the collection probe, as well as the width of the primary channel and the width of the collection probe can be altered such that the cut point of the fractionator is tailored to a PM mean diameter between 100 nm and 10 um. The spacing can be set during design by using different thicknesses for the device layer of the SOI wafer.

Figure 4:
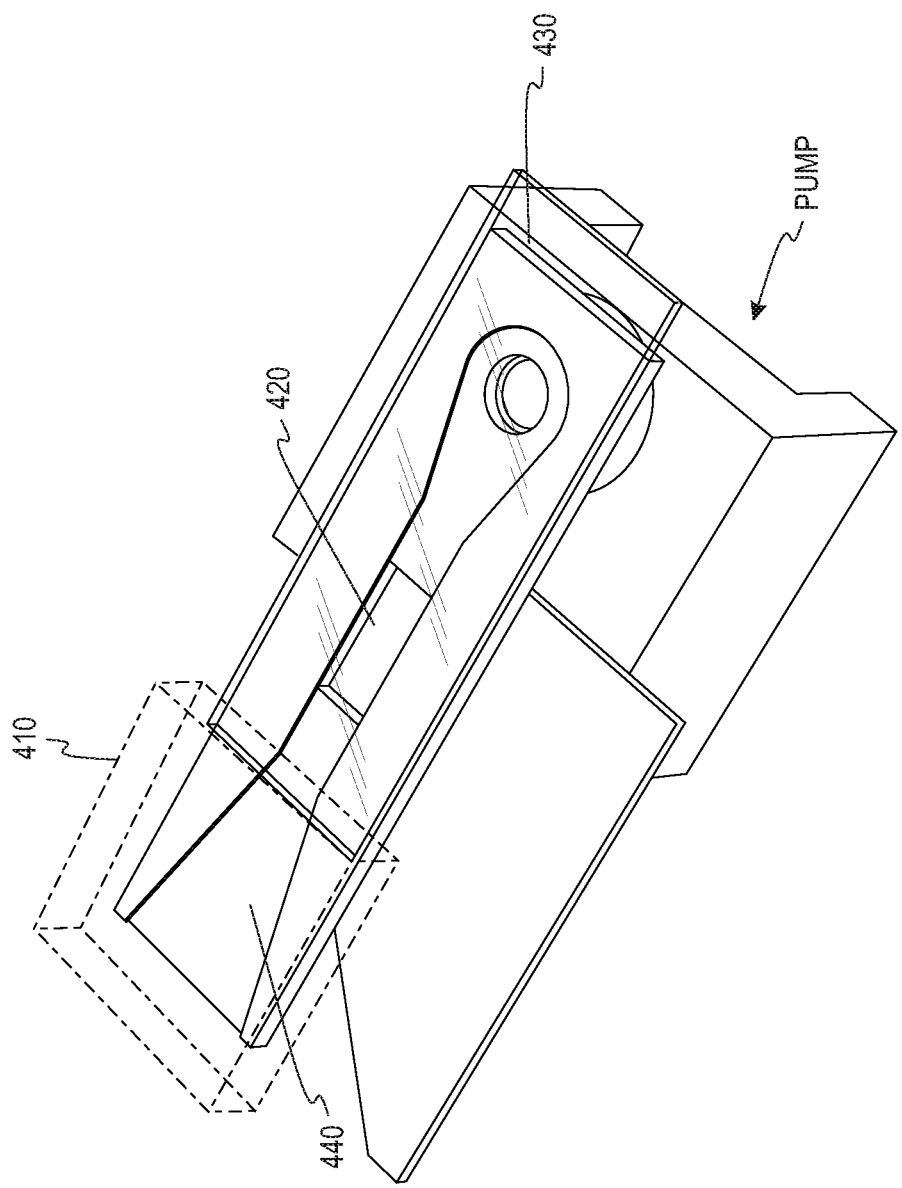
FIG. 4 illustrates an example PM monitor comprising the microfabricated vertical fractionator of FIG. 2A, according to aspects of the present disclosure.

FIG. 4 illustrates an example PM monitor 400 comprising the microfabricated vertical fractionator of FIG. 2A, according to aspects of the present disclosure. The compact configuration of the vertical fractionator provides for a PM monitor that has a reduced form-factor and can serve in wearable applications. Shown on the PM monitor 400 is a space 410 for a vertical fractionator, such as the fractionator 200, a sensing area 420, a top wafer 430, and a middle wafer 440. The top wafer 430 retracts to provide the space 410 for the vertical fractionator to interface. Microfabricated fixtures on the middle wafer 440 can be used to increase the precision of mating the vertical fractionator, such as fractionator 200, with the middle wafer 440 and to facilitate alignment of the structures. Apertures, channels, and such features may be etched, drilled, or otherwise formed at one or more of the layers. Meanwhile, other components may be assembled on, and supported by, one or more of the layers.

Figure 5A:
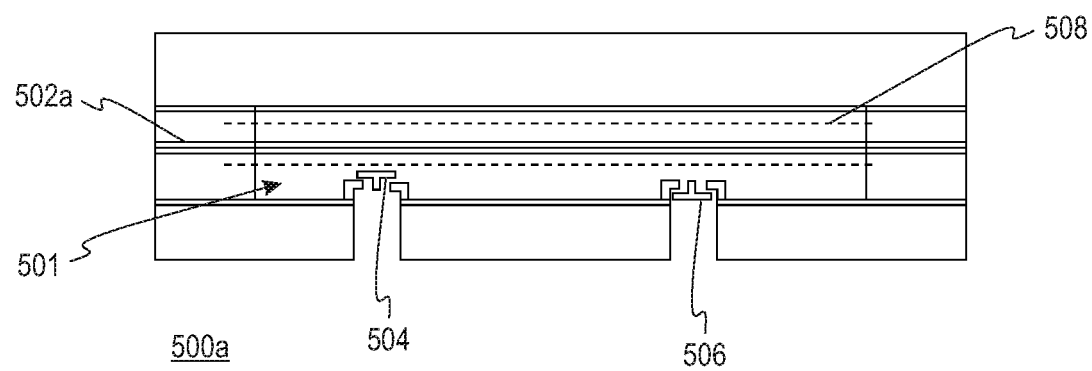
FIG. 5A illustrates an example diaphragm pump for a PM monitor, according to aspects of the present disclosure.

FIG. 5A illustrates an example microfabricated diaphragm pump 500a that can provide airflow for major flow and minor flow in a virtual impactor, such as the major flow shown by paths 216 and the minor flow shown by path 218 in the fractionator 200 described above. The pump 500a includes a chamber 501 with a membrane 502a. The pump 500a also includes an inlet valve 504 and an outlet valve 506 in fluid communication with the chamber 501. When actuated, the membrane 502a reciprocates to generate a negative pressure that draws air into the chamber 501 via the inlet valve 504 and then to expel air from the chamber 501 via the outlet valve 506. The negative pressure in the chamber 501 causes the outlet valve 504 to close. Conversely, the push of air from the chamber 501 causes the inlet valve 504 to close. In one embodiment, the valves may be actuated using an external actuation signal. The membrane 502a can be actuated by electrostatic actuation, piezoelectric actuation, thermal actuation, or by another similar actuation mechanism. For instance, FIG. 5A shows electrodes 508 for electrostatic actuation of the membrane 502a. Features of the pump 500a may be formed via a micro-stereolithography technique, such as 2-photon stereolithography.

Accordingly, the pump 500a can be deployed downstream of a virtual impactor outlet and/or of the sensing region of the PM monitor. The inlet valve 504 is in fluid communication with the major and minor channels of the virtual impactor. When the membrane 502a generates the negative pressure in the chamber 501, air is drawn through the major and minor channels and/or across the sensing area of the PM monitor, into the pump 500a to create airflow. The pump 500a then pushes the air via the outlet valve 506 to the outlet (exhaust) of the PM monitor.

Figure 5B:
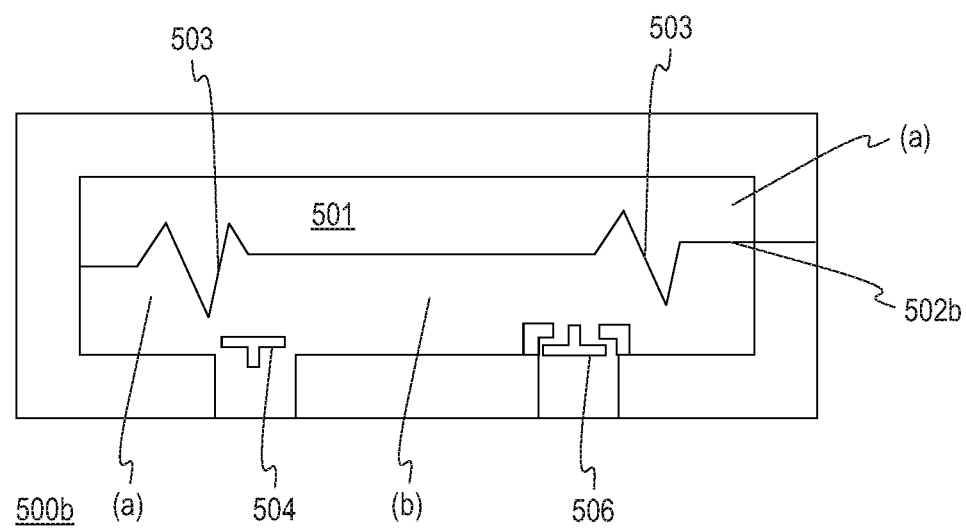
FIG. 5B illustrates an example diaphragm pump for a PM monitor, where the pump employs an alternative membrane, according to aspects of the present disclosure.

FIG. 5B illustrates an example microfabricated diaphragm pump 500b that employs an alternative membrane 502b with the inlet valve 504 and the outlet valve 506. The membrane 502b is fabricated stereolithographically to include one or more expandable/compressible folded sections 503 that allow larger displacement of the membrane 502b within the chamber 501 while keeping the membrane 502b from exceeding the yield strength of the membrane material.

Figure 5C:
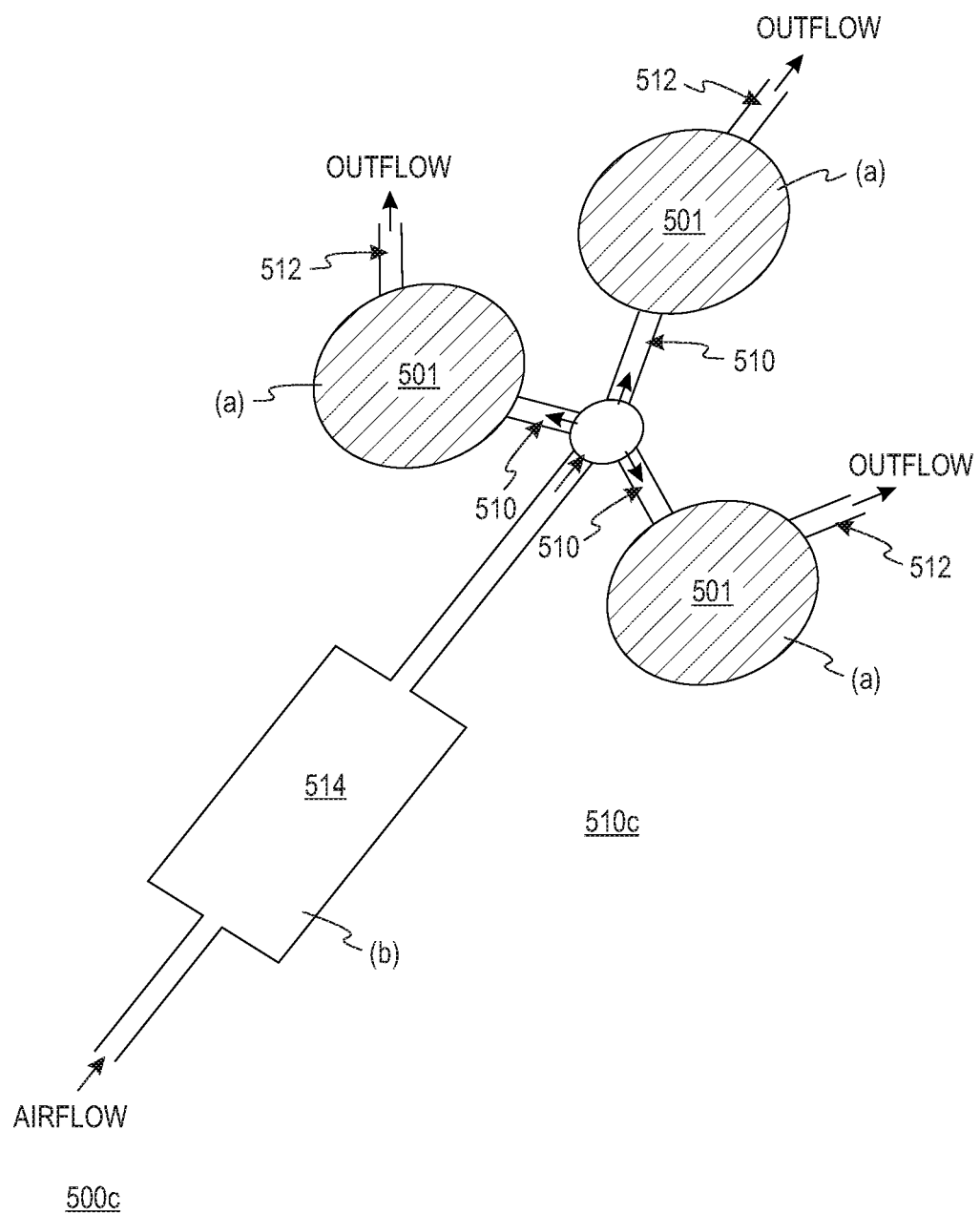
FIG. 5C illustrates an example diaphragm pump for a PM monitor, where the pump includes a plurality of chambers, according to aspects of the present disclosure.

FIG. 5C illustrates another example microfabricated diaphragm pump 500c. The pump 500c includes a plurality of chambers 501. Each chamber 501 is configured with a membrane as described above to pump air into and out of the chamber 501. The chambers 501 can be connected in parallel or in series to increase and thereby provide for streamline or laminar flow being drawn through the pump 500c. Actuation of the membranes in the chambers 501 may be synchronized so that the airflow remains as constant as possible and does not pulsate.

When connected in parallel, the membranes in the chambers 501 may be activated with the same frequency, but with a phase offset, to balance the combined flow. As shown in FIG. 5C, for instance, the pump 500c includes three chambers 501 connected in parallel, where the chambers 501 are driven with a 120° phase offset to smooth out the input flow.

The pump 500c includes inlet channels 510 that lead to the chambers 501, respectively. The inlet channels 510 are sized to provide flow balancing between the chambers 501 to promote smooth inflow. The pump 500c also includes outlet channels 512 that lead to the chambers 501, respectively. In some embodiments, one or more reservoirs are formed at the inlet channels 510 and/or the outlet channels to further reduce disruption between layers of fluid flow, or smooth out the flow. As shown in FIG. 5C, for instance, the pump 500c includes a reservoir 514 in fluid communication with the inlet channels 510. Air passes through the reservoir 514 to smooth out the flow before reaching the chambers 501. In further embodiments, the reservoirs may also include a membrane, similar to those in the chambers 501, which allow for active or passive compliance that smooths out the flow.

Figure 6:
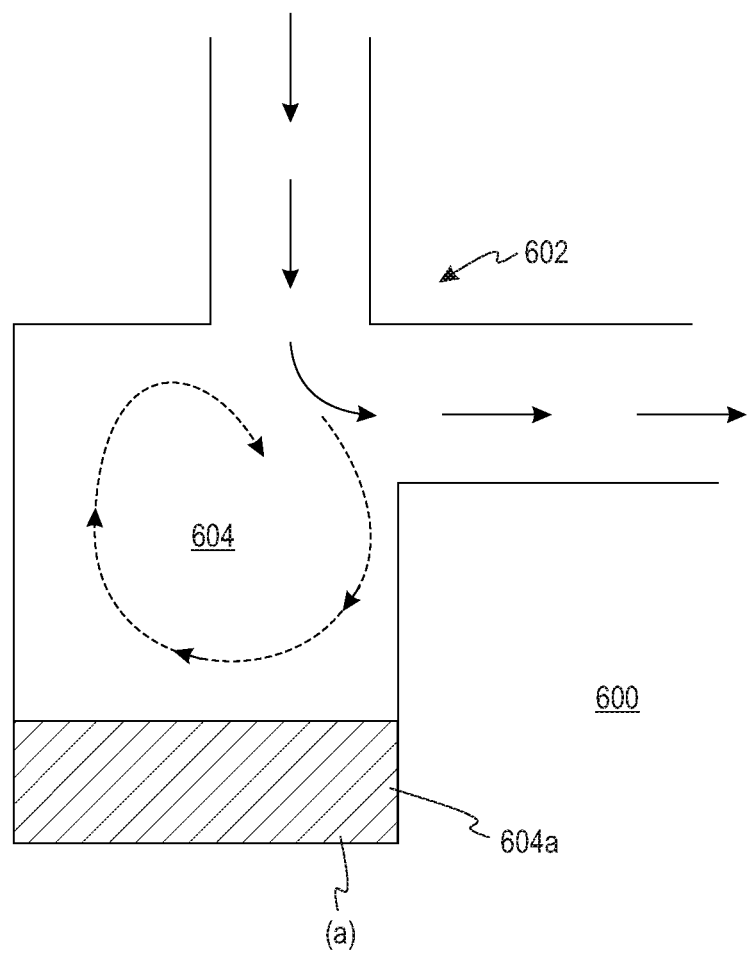
FIG. 6 illustrates an example microfabricated virtual cyclone for a PM monitor, according to aspects of the present disclosure.

FIG. 6 illustrates an example microfabricated virtual cyclone 600 for a PM monitor, such as the PM monitor 100. The virtual cyclone 600 is positioned to receive minor flow from a virtual impactor such as the vertical fractionator 200, upstream of the pump (e.g., the pump 500a, b, c). The virtual cyclone 600 includes a bend 602 of approximately 90° in certain embodiments. The virtual cyclone 600 also includes a collection chamber 604 positioned at the bend 602. As shown in FIG. 6, the minor flow passes through the bend 602. Due to inertial forces, larger PM (greater than a threshold size) in the flow are not able to follow the bend 602 and thus pass into the collection chamber 604. Advantageously, the larger PM are removed from the flow before the air reaches the pump. In some cases, the collection chamber 604 may include a PM collection surface 604a that can be removed for cleaning or replaced to remove the larger PM from the virtual cyclone 600.

Figure 7:
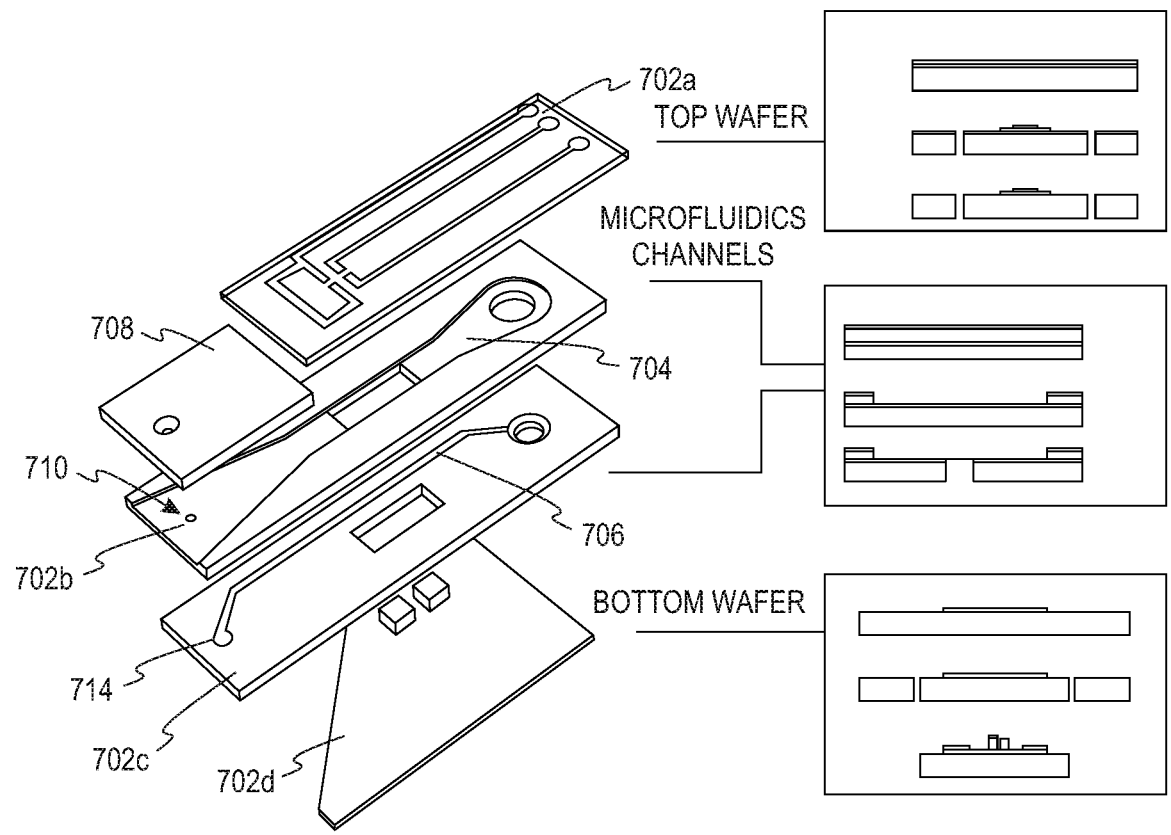
FIG. 7 illustrates an example PM monitor where the minor flow paths and major flow paths are fabricated on different wafers, according to aspects of the present disclosure.

FIG. 7 illustrates example PM monitor 700 where the minor channels and major channels are fabricated on different wafers and layered vertically. In particular, the PM monitor 700 includes a top wafer 702a and a bottom wafer 702d. Between the top wafer 702a and the bottom wafer 702d, the PM monitor 700 includes a first middle wafer 702b and a second middle wafer 702c. The PM monitor 700 includes a virtual impactor 708, such as the fractionator 200, major channel 704 that is formed in the first middle wafer 702a and a minor channel 706 that is formed in the second middle wafer 702c. A virtual cyclone 714 as described above may also be formed in the second middle wafer 702c. The wafers 702a-d are assembled vertically to form the PM monitor 700 partially. The wafers 702a-d are also assembled with a fractionator element 708 from which the major channel 704 and the minor channel 706 flow. As shown in FIG. 7, a cone shape 710 formed in the first middle wafer 702b assists in the alignment of the top layer for a vertical virtual impactor, such as the fractionator 200, as described above.

Having described the invention in detail and by reference to specific embodiments thereof, it will be apparent that modifications and variations are possible without departing from the scope of the invention as set forth in the present disclosure. More specifically, although some aspects of the present invention are identified herein as particularly advantageous, it is contemplated that the present invention is not necessarily limited to these particular aspects of the invention.

What is claimed is:

1. A fractionator for a particulate matter (PM) monitor, comprising:
a body defining a vertical air inlet to receive a stream of air from outside the body, the stream of air comprising particles of varying sizes;
a plurality of microfluidic channels within the body, wherein inertial forces within the microfluidic channels are configured to separate the particles by size;
a horizontal air outlet in fluid communication with at least one of the plurality of microfluidic channels for particles having a size below a threshold size; and
a vertical air outlet in fluid communication with at least one of the plurality of microfluidic channels for particles having a size above a threshold size;
wherein the fractionator comprises a first wafer and a second wafer bonded together, wherein each wafer comprises a device layer, a buried oxide (BOX) layer, and a handle layer.

2. The fractionator of claim 1, further comprising a filter extending across the vertical air inlet to block particles with an aerodynamic diameter larger than 10 µm from entering the vertical air inlet.

3. The fractionator of claim 1, wherein the plurality of microfluidic channels comprises:
a primary channel in fluid communication with the vertical air inlet and extending in a substantially straight path from the vertical air inlet to the vertical air outlet exiting the fractionator; and
one or more secondary channels extending at an angle from the primary channel.

4. The fractionator of claim 3, wherein the one or more secondary channels extend at a 90 degree angle from the primary channel.

5. The fractionator of claim 3, wherein the vertical air inlet comprises an opening of a first diameter and an acceleration region comprising angled walls extending from the vertical air inlet to the primary channel, the primary channel having substantially parallel walls and a second diameter that is smaller than the first diameter.

6. The fractionator of claim 3, wherein in each wafer, the device layer is affixed to a first side of the BOX layer and the handle layer is affixed to a second side of the BOX layer that is opposite the first side.

7. The fractionator of claim 6, wherein the vertical air inlet is formed through the handle layer of one of the first wafer and the second wafer.

8. The fractionator of claim 7, further comprising a collection probe formed in the device layer of one of the wafers, wherein the collection probe defines an opening, the opening coupling the one or more secondary channels to the vertical air outlet.

9. A method for separating components in an air sample, comprising:

directing an airflow through the vertical air inlet of the fractionator of claim 3 and through the primary channel; and applying inertial forces to direct particles having a size below the threshold size to the one or more secondary channels, wherein the one or more secondary channels extend from of the primary channel at an angle;

wherein particles having a size above the threshold size continue to flow through the primary channel to the vertical air outlet of the fractionator.

10. The method of claim 9, further comprising:

filtering particles with an aerodynamic diameter larger than 10 μm in the airflow prior to the vertical air inlet via application of a coarse particle filter.

11. The method of claim 9, wherein the portion of the airflow that proceeds to follow the one or more secondary channels is a major flow.

12. The method of claim 9, wherein the portion of the airflow that proceeds to follow the primary channel to the vertical air outlet is a minor flow.

13. A method to fabricate the fractionator of claim 1, comprising:

etching the first wafer and the second wafer, wherein each of the first wafer and the second wafer comprises a three layer stack of the device layer affixed to the buried oxide (BOX) layer affixed to the handle layer;

rotating the first wafer such that the device layer of the first wafer faces the device layer of the second wafer; and bonding the device layer of the first wafer to the device layer of the second wafer.

14. The method of claim 13, wherein the etching further comprises:

applying a mask to the device layer of the first wafer and the device layer of the second wafer and etching the device layer of the first wafer and the device layer of the second wafer around the mask, wherein the portion of each device layer under the mask forms a collection probe;

etching through the handle layer, BOX layer, and device layer of the first wafer to form a first part of a primary channel; and etching through the handle layer, BOX layer, and device layer of the second wafer to form a second part of the primary channel;

wherein the handle layer of the first wafer and the handle layer of the second wafer each comprises a first surface and a second surface, each second surface being affixed to each corresponding BOX layer;

wherein an opening forming the first part of the primary channel at the first surface of the handle layer of the first wafer comprises a larger diameter than an opening forming the second part of the primary channel at the first surface of the handle layer of the second wafer.

15. The method of claim 14, wherein the device layers of the first wafer and the second wafer are etched using deep reactive-ion etching (DRIE).

16. The method of claim 14, wherein the handle layer, BOX layer, and device layer of the second wafer are etched using a combination of DRIE and one or both of isotropic and nonisotropic etching to form the second part of the primary channel.

17. A particulate matter (PM) monitor, comprising a pump and the fractionator of claim 1, wherein the pump comprises:

a body forming a chamber;

a membrane disposed in the chamber;

an actuator coupled to the membrane;

an inlet valve in fluid communication with the chamber; and an outlet valve in fluid communication with the chamber, wherein the actuator is operable to displace the membrane in the chamber to generate a negative pressure that draws air into the chamber via the inlet valve and to expel the air from the chamber via the outlet valve.

18. The particulate matter (PM) monitor of claim 17, wherein the actuator is an electrostatic, piezoelectric, or thermal actuator.

19. The particulate matter (PM) monitor of claim 17, wherein the membrane includes one or more expandable/compressible folded sections.

20. The particulate matter (PM) monitor of claim 17, wherein the body includes one or more additional chambers, the one or more additional chambers including a respective membrane, a respective inlet valve, and a respective outlet valve, the respective membrane being displaceable in the corresponding chamber to generate a respective negative pressure that draws air into the corresponding chamber via the respective inlet valve and to push the air out of the corresponding chamber via the respective outlet valve.

21. The particulate matter (PM) monitor of claim 20, wherein actuation of the membranes in the chambers is synchronized to provide substantially constant airflow in the pump.

22. The particulate matter (PM) monitor of claim 20, wherein the chambers are connected in parallel or in series.

23. The particulate matter (PM) monitor of claim 20, wherein the chambers are connected in parallel and the membranes are actuated with the same frequency, but with a phase offset.

24. The particulate matter (PM) monitor of claim 20, further comprising inlet channels leading to the chambers and configured to provide flow balanced between the chambers.

25. The particulate matter (PM) monitor of claim 20, further comprising one or more reservoirs positioned upstream or downstream of the chambers to provide a laminar airflow in the pump.

26. The particulate matter (PM) monitor of claim 25, wherein the one or more reservoirs include respective reservoir membranes providing active or passive compliance.

27. The particulate matter (PM) monitor of claim 17, further comprising a virtual cyclone, the virtual cyclone comprising a bend positioned at a flow path through a primary channel of the fractionator and a collection chamber positioned at the bend, wherein air in the flow path passes through the bend and PM in the air greater than a threshold size pass into the collection chamber.

28. The particulate matter (PM) monitor of claim 27, wherein the bend is approximately 90°.

29. The particulate matter (PM) monitor of claim 27, wherein the collection chamber includes a removable collection surface configured to receive the PM greater than the threshold size.

* * * * *